United States Patent Office 3,100,736
Patented Aug. 13, 1963

3,100,736
METHOD FOR THE PRODUCTION OF HIGHLY PURIFIED CALLICREIN PREPARATIONS
Eugen Werle and Ivar Trautschold, Munich, Germany, assignors to Farbenfabriken Bayer Aktiengesellschaft, Leverkusen, Germany, a corporation of Germany
No Drawing. Filed Mar. 16, 1961, Ser. No. 96,087
Claims priority, application Germany Mar. 25, 1960
3 Claims. (Cl. 167—74)

For many years, the circulatory hormone callicrein has been used therapeutically for disturbances in blood circulation. It is chiefly prepared from pancreas, submaxillary and urine.

In conventional purification methods of callicrein difficulty arises because the active substance cannot satisfactorily be separated from the accompanying protein.

However, protein-containing callicrein products have the disadvantage of giving rise to undesirable side reactions in their therapeutic application.

It has now been found that highly purified callicrein preparations can be prepared by adsorbing callicrein from its solutions on basicaly substituted cellulose, washing the adsorbate with a highly dilute buffered electrolyte solution until a nearly protein-free filtrate is obtained and extracting the active substance from the adsorbate with a solution containing at least 1% buffered electrolyte.

Among the basically substituted celluloses, diethyl aminoethyl cellulose (DEAE cellulose) and triethyl aminoethyl cellulose (TEAE cellulose) are especially well suitable. However, good results are also obtained with p-aminobenzyl cellulose (PAB cellulose) and with Ecteola (reaction product of epichlorhydrin, triethanolamine and Na-cellulose).

The aforesaid basically substituted celluloses are advantageously pretreated with buffer solutions, preferably phosphate buffer solutions whereby the concentration of these buffer solutions should not exceed M/50.

The adsorption on said basically substituted celluloses can take place within a very wide pH range. Merely pH ranges of below 3 and above 10 are not applicable since callicrein would wholly or partially be destroyed within these ranges. The operation is most suitably carried out within the physiological pH range, i.e. at pH 6.0–7.5.

Occasionally, it may prove to be useful to subject the solutions to be purified to a preliminary purification with the aid of acid-substituted celluloses.

After the adsorption, the adsorbate is washed with highly dilute buffered electrolyte solutions, preferably sodium chloride/phosphate buffer solutions, until a nearly protein-free filtrate is obtained.

For the subsequent elution, solutions of all electrolytes are suitable. There may be mentioned in the first place solutions of sodium chloride, potassium chloride, ammonium chloride as well as conventional phosphate buffer solutions. For the elution, solutions must be used the concentration of which is at least 1%. With 5% solutions, a quantitative elution is obtained.

The method according to the invention enables a good purification effect to be obtained and a very good separation of callicrein from the accompanying protein. If the adsorption is carried out by merely stirring the pretreated basically substituted cellulose with the callicrein solution, a purification of up to 10–20$\gamma$ protein/C.U. can be obtained. If, however, the adsorption is carried out on columns, preparations of 10–3$\gamma$ protein/C.U. are obtained depending on whether a simple elution of a gradient elution is being carried out.

The following examples are given for the purpose of illustrating the invention.

Example 1

182 ml. of a submaxillary callicrein solution with 125 C.U./ml. and 11.2 mg. protein/ml. have a specific activity of 89$\gamma$ protein/C.U. 25 g. of dry DEAE cellulose are equilibrated in the form of the hydrochloride with M/100 phosphate buffer pH 7.0 and stirred into the callicrein solution. After some standing, the cellulose is centrifuged off and washed four times with 200 ml. portions of buffer. The elution with a 5% sodium chloride solution in M/20 phosphate buffer pH 7.0 is effected in three fractions.

| Fraction | Ml. | C.U./ml. | Mg. prot./ml. | Prot./ C.U. | Total C.U. | $x$-times purif. |
|---|---|---|---|---|---|---|
| 1 | 95 | 150 | 3.53 | 23.6$\gamma$ | 14,250 | 3.8 |
| 2 | 100 | 53 | 0.85 | 16$\gamma$ | 5,300 | 5.6 |
| 3 | 100 | 30 | 0.30 | 10$\gamma$ | 3,000 | 8.9 |

NOTE.—Yield: 99%.

Example 2

2 g. of powdered dry pancreas callicrein with 21,200 C.U. and 1228 mg. of protein (57.7$\gamma$ protein/C.U.) are dissolved with M/100 phosphate buffer pH 7.0, and 30 g. of DEAE cellulose (21.7 g. dry powder), equilibrated with M/100 phosphate buffer pH 7, are stirred into the solution, and, after 15 minutes, filtered with suction through a fritted glass under slight reduced pressure. The cellulose is washed first with 200 ml. of buffer and then extracted with 0.4% sodium chloride solution in M/100 phosphate buffer pH 7 until the protein content of the filtrate decreases to at least below 10$\gamma$ protein/ml. 75% of the adsorbed protein are washed out without loss of callicrein. For elution, the product is washed with a 5% sodium chloride solution in M/20 phosphate buffer pH 7.0

| Fraction | Ml. | C.U./ml. | Mg. prot./ml. | Prot./ C.U. | Total C.U. | $x$-times purif. |
|---|---|---|---|---|---|---|
| 1 | 80 | 207 | 2.475 | 12$\gamma$ | 16,560 | 4.8 |
| 2 | 45 | 69 | 0.511 | 7.4$\gamma$ | 3,100 | 7.8 |

NOTE.—Yield: 92.6%.

Example 3

100 ml. of a pancreas-callicrein solution with 210 C.U./ml. and a purity degree of 56.8$\gamma$ protein/C.U. are applied to a column, 25 mm. inside diameter, into which 22 g. of DEAE cellulose stirred with buffer have been carefully suspended and equilibrated with buffer. The callicrein solution is adsorbed with 2 ml./minute, initially washed with buffer and then extracted with a 0.5% sodium chloride solution in M/100 phosphate buffer pH 7.0 until the filtrate is below 10$\gamma$ protein/ml. About 80% of the protein adsorbed are washed out without loss of callicrein. For elution, the product is washed with a 5% sodium chloride solution in M/20 phosphate buffer pH 7.0.

| Fraction | Ml. | C.U./ml. | Mg. prot./ml. | Prot./ C.U. | Total C.U. | $x$-times purif. |
|---|---|---|---|---|---|---|
| 1 | 13 | 800 | 8.25 | 10.3$\gamma$ | 10,400 | 5.5 |
| 2 | 14 | 350 | 1.51 | 4.3$\gamma$ | 4,900 | 13.2 |
| 3 | 50 | 50 | 0.31 | 6.2$\gamma$ | 2,500 | 9.2 |

NOTE.—Yield: 85%.

We claim:
1. Method for the production of highly purified callicrein preparations characterized by adsorbing callicrein from its solutions on a basically substituted cellulose selected from the group consisting of diethyl aminoethyl cellulose, triethyl aminoethyl cellulose, and p-aminobenzyl cellulose, washing the adsorbate with a highly dilute buffered electrolyte solution wherein said electrolyte is selected from the group consisting of sodium chloride, potassium chloride and ammonium chloride until a nearly protein-free filtrate is obtained extracting the active substance from the adsorbate with a buffered solution containing at least 1% of a member selected from the group consisting of sodium chloride, potassium chloride and ammonium chloride electrolyte.

2. Method as claimed in claim 1 characterized by using diethyl aminoethyl cellulose as adsorption agent.

3. Method as claimed in claim 1 characterized by using triethyl aminoethyl cellulose as adsorption agent.

References Cited in the file of this patent

Sober: J.A.C.S., vol. 76, March 20, 1954, pages 1711 and 1712.

Sober: J.A.C.S., vol. 78, February 20, 1956, pages 756, 760 to 763.

Cutting: Annual Review of Pharmacology, vol. 1, 1961, page 196.